INVENTORS
Francis J. Lynch
Donald L. Miller

BY Bailey, Stephens and Huettig
ATTORNEYS

Feb. 6, 1968   F. J. LYNCH ETAL   3,367,170
SURFACE FRICTION TESTER
Filed Aug. 5, 1965   2 Sheets-Sheet 2
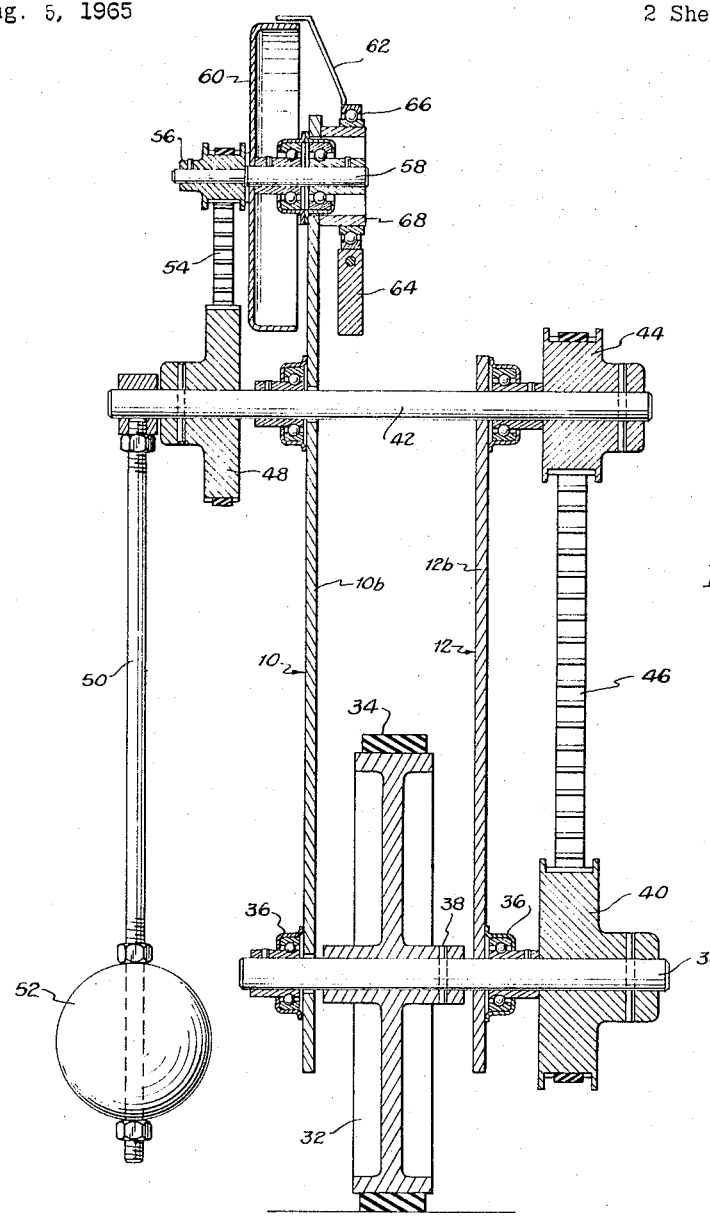
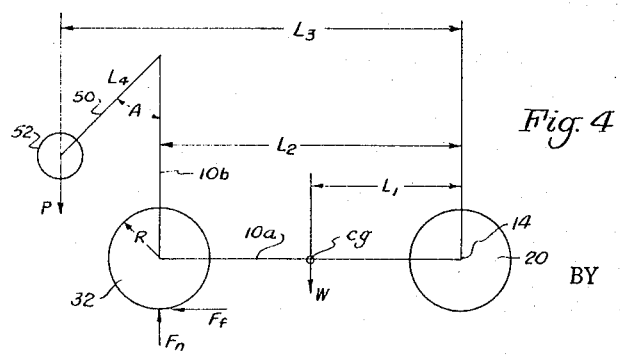
INVENTORS
Francis J. Lynch
Donald L. Miller
BY Bailey, Stephens and Huettig
ATTORNEYS

United States Patent Office 3,367,170
Patented Feb. 6, 1968

3,367,170
SURFACE FRICTION TESTER
Francis J. Lynch and Donald L. Miller, Bellefonte, Pa., assignors to John I. Thompson & Company, Washington, D.C., a corporation of Delaware
Filed Aug. 5, 1965, Ser. No. 477,453
5 Claims. (Cl. 73—9)

ABSTRACT OF THE DISCLOSURE

To measure the coefficient of friction of a surface a body having a shiftable center of gravity is pulled or pushed along the surface. A scale is attached to the body. When the center of gravity has shifted enough to create a restoring force equal to the moment introduced by the friction force, the reading on the scale at that instant is the coefficient of friction of the surface.

---

This invention relates to a machine for testing the friction characteristics of a surface. In particular, the device relates to a tester for obtaining a quick spot check of the friction characteristics of any surface.

Heretofore, three general types of apparatus have been used for testing the frictional characteristics of, for example, a road surface. First there are devices with a wheel fitted with a brake drum. When the wheel is pulled over a surface, a force is applied to the brake drum, and when this force is great enough to stop the rolling of the wheel, a measure of the frictional characteristic of the road surface is obtained. Hydraulic and electrical means are usually used to apply and measure the force. Second, there is the British Portable Tester which is a stationary device composed of a stand supporting a pendulum having a rubber shoe on the pendulum weight. The pendulum is lifted manually and then dropped. The shoe engages the road surface and the loss of energy caused by the shoe sliding on the road surface measured by the distance the pendulum rises to the end of its swing is a measure of the frictional characteristic of the skid resistance of the road surface. The third generally used skid resistance measuring device is the Penn State Drag Tester in which a carrier on wheels is used to drag a shoe over the road surface. A hydraulic piston pulled by the drag of the shoe is coupled to an indicator for measuring the drag resistance of the shoe to show the skid resistance of the road surface. None of these devices give entirely satisfactory results under various operating conditions. The first and third devices are relatively expensive to construct, while the British Portable Tester is not accurate when applied to inclined surfaces.

The object of this invention is to produce a simple mechanical apparatus which will give an accurate indication of the friction characteristics of a surface under any conditions, and which is of inexpensive manufacture and portable. In general, these objects are accomplished by the use of a test wheel adapted to roll on the surface to be tested, together with means to prevent the pressure of the wheel on the ground from being lessened as force is applied to the test wheel to slow the turning of the test wheel until the wheel stops and skids on the surface being tested. This tendency of the test wheel to exert less pressure on the surface as wheel restraining force is applied is termed unloading. In this invention, the test wheel is coupled to a weighted arm which is used to apply the restraining force to the test wheel. The arm is coupled to an indicator. The test wheel turns until the weighted arm is lifted to such an extent that the force needed to lift the weight further is greater than the frictional resistance between the wheel and the surface being tested and the wheel begins to slide. When the wheel slides, the indicator shows a value representing the skid resistance of the surface being tested.

The means by which the objects of the invention are obtained are disclosed more fully with reference to the accompanying drawings in which:

FIGURE 3 is a cross-sectional view taken on the line 3—3 of FIGURE 2; and

FIGURE 4 is a diagram of the forces applied in the testing device.

Figure 1:
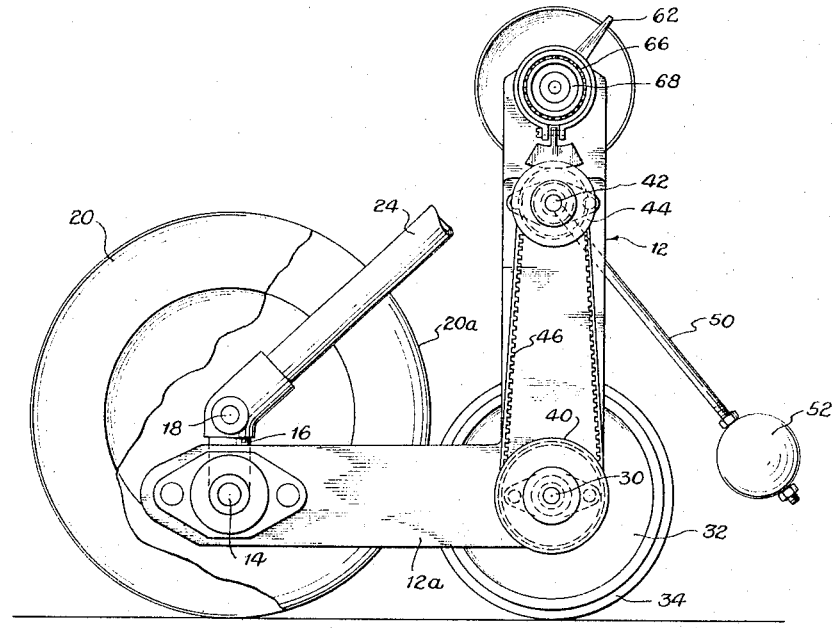
FIGURE 1 is a side elevational view of one side of the surface friction tester.
Figure 2:
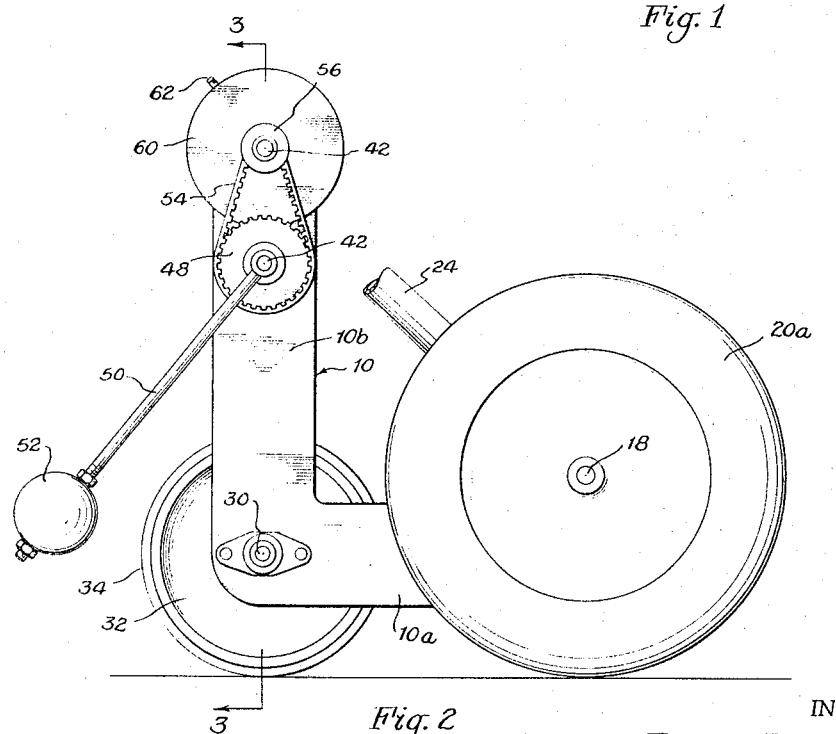
FIGURE 2 is a side elevational view of the opposite side of the tester.

The tester is composed of a pair of L-shaped frames 10 and 12 each having a horizontal portion 10$a$ and 12$a$ and a vertical portion 10$b$ and 12$b$. As shown in FIGURE 1, the outer ends of the horizontal portions 10$a$ and 12$a$ are separated by a spacer bar 14 which supports posts 16. A front wheel axle 18 is journalled in bearings on these posts 16 and the front stabilizing wheels 20 and 20$a$ are carried by this axle. A handle bar 24 is also attached to the axle for manually pushing the tester. Antifriction bearings are used to pivotally mount the horizontal portions 10$a$ and 12$a$ on the spacer bar 14.

An axle 30 extending through the elbow of the frame members carries test wheel 32 which is adapted to ride on the surface to be tested. This test wheel has a tread 34 composed of ASTM E–17 rubber which is standard for all pavement skid testing devices. Other tread materials can be used depending upon the surface material being tested. Axle 30 is journalled in antifriction bearings 36 and fastened by a pin 38 to wheel 34. The axle extends outwardly of frame member 12 which carries a sprocket wheel 40.

The shaft 42 is journalled in the upper ends of upright frame portions 10$b$ and 12$b$ and carries a sprocket wheel 44 which is joined to wheel 40 by a toothed belt 46. Outwardly of frame portion 10$b$ is a sprocket wheel 48 and an arm 50 having a weight 52 fastened to its free end. Sprocket wheel 48 is connected by a toothed belt 54 to a sprocket 56 which is joined to a shaft 58 for turning a scale dial 60.

A pointer 62 has a counterweight 64 and is mounted by antifriction bearings 66 on a cylinder 68 secured to the upper end of frame portion 10$b$. The pointer thus remains in the same position relative to the vertical regardless of the fore or aft tilt of the machine on an inclined surface. This compensates for the fact that arm 50 remains vertical when the machine is inclined and thus pointer 62 is zeroed on scale dial 60 when the machine is standing still.

In operation, the device is pushed manually by handle 24 over the surface to be tested. The front wheels 20 and 20$a$ carry the front end of the frame and stabilize a pivot point formed by the spacer bar 14. As the tester moves forwardly, wheel 32 rotates and thus causes shaft 42 to turn and raise weight 52 in an arcuate path. Also, indicator dial 60 is turned. The weight 52 is raised until the frictional force between the tread 34 and the surface being tested is not sufficient to raise the weight any higher. At this moment, the scale dial 60 has been rotated to produce a number beneath pointer 62 indicating the frictional force necessary to stop wheel 32 from turning. Further pushing of the tester forwardly results in the wheel 32 stopping and skidding on the surface being tested.

The action of the forces involved in this tester are shown in FIGURE 4. The spacer bar 14 forms a pivot point for the forward end of the frame and the tester has a center of gravity $cg$, at which there is a downward force W. Tester wheel 32 bears on the surface being tested with a force $Fn$ and with a rolling friction force $Ff$ when some restraining force is applied to wheel 32 while it is being rolled over a surface. Without the weight 52, the moment over radius R caused by the frictional force on the test wheel reduces the effective force Fn, which is called unloading, thereby causing an erroneous indication of Ff. In this invention, such unloading is prevented by the use of the weight 52 because as the weight 52 is lifted by the turning of wheel 32, the position of the center of gravity is adjusted so that the value Fn remains constant. This ensures an accurate measurement of the frictional resistance of the surface.

As shown in FIGURE 4, in order to keep wheel 32 rolling, $Fn=Ff$, where Fn is the tire load and Ff is the coefficient of friction. The torque required to lift weight 52 is $T=L4 \cdot P \cdot \sine A$, wherein T is the torque, L4 the length of arm 50, P the weight 52, and A the angle arm 50 is moved from the vertical.

In operation, the static value for Fn when the tester is at a standstill is given by the formula:

$$(L1 \times Wcg) + (L2 \times P) = Fn \times L2 \quad (I)$$

and the dynamic value of Ff is given by the formula:

$$(L1 \times Wcg) + (L3 \times P) = (L2 \times Fn) + (R \times Ff) \quad (II)$$

Formula II demonstrates that the system stays in equilibrium and the value Ff is the effective coefficient of friction.

Having now described the means by which the objects of the invention are obtained,

We claim:

1. A surface friction tester comprising test wheel means for rolling engagement with the surface to be tested, frame means supported by said wheel means, weight means movably mounted on said frame means, means joining said wheel means to said weight means for shifting said weight means in response to movement of said wheel means to shift the position of the center of gravity of the tester when being moved an amount just sufficient to keep the test wheel means from unloading, and means coupled to said weight means for indicating the coefficient of friction of the surface tested as a function of the position of said weight means.

2. A surface friction tester comprising wheel means for rolling engagement with the surface to be tested, a weighted arm coupled to said wheel means and pivoted by the turning of said wheel means for being lifted by the turning of said wheel means, and indicator means joined to said weight means for indicating the distance said weight means is moved before said wheel means skids and stops rolling on the surface being tested.

3. A tester as in claim 2, said wheel means comprising a test wheel, and test wheel frame means for supporting said weighted arm and indicator means on said test wheel.

4. A tester as in claim 3, further comprising guide wheel means joined to wheel frame means for stabilizing movement of said test wheel.

5. A tester as in claim 4, further comprising handle means pivotally connected to wheel frame means for pushing said tester without exerting substantial downward pressure on said test wheel.

References Cited
UNITED STATES PATENTS

| | | | |
|---|---|---|---|
| 2,496,405 | 2/1950 | Foufounis | 73—9 |
| 2,700,297 | 1/1955 | Allen | 73—9 |
| 2,821,081 | 1/1958 | Staples | 73—9 X |
| 2,955,455 | 10/1960 | Frederik | 73—9 |

LOUIS R. PRINCE, *Primary Examiner.*

J. NOLTON, *Assistant Examiner.*